United States Patent

[11] 3,586,049

| [72] | Inventor | Robert A. Adamson<br>2493 Plumleigh Drive, Fremont, Calif. 94538 |
|---|---|---|
| [21] | Appl. No. | 888,798 |
| [22] | Filed | Dec. 29, 1969 |
| [45] | Patented | June 22, 1971 |

[54] OSCILLATORY VALVE FOR SELECTIVELY CONNECTING THREE INLETS TO AN OUTLET
6 Claims, 2 Drawing Figs.

[52] U.S. Cl. ................................................ 137/625.41
[51] Int. Cl. .................................................. F16k 11/08
[50] Field of Search .................................... 137/625.47, 625.46, 625.16, 625.11, 625.41

[56] References Cited
UNITED STATES PATENTS

| 944,598 | 12/1909 | Caskey | 137/625.41 X |
| 2,335,085 | 11/1943 | Roberts | 137/625.47 X |
| 2,680,455 | 6/1954 | Raiteri | 137/625.41 X |
| 3,157,201 | 11/1964 | Littmann | 137/625.47 |
| 3,519,021 | 7/1970 | Wiswell | 137/625.47 |

Primary Examiner—M. Cary Nelson
Assistant Examiner—Michael O. Sturm
Attorney—Julian Caplan ABSTRACT: An open end, circular valve housing having a cover for the open end of the housing receives an oscillatory valve body with one annular seal partially recessed into the housing and bearing against a groove in the edge of one surface of the valve body and a second seal partially recessed into the cover and bearing against another groove in the edge of the opposite surface of the valve body. There is a radial outlet port in the housing and three radial inlet ports, one 120°, and two others 90°, from the outlet. The body has five radial ports intercommunicating at the center, the middle port having two adjacent (outlet) ports spaced 30° to either side and two remote (inlet) ports spaced 120° to either side. By turning a handle connected to the valve body 30° to either side of a central position, any of the three inlet ports of the housing may be connected to the outlet port.

INVENTOR.
ROBERT A. ADAMSON

INVENTOR.
ROBERT A. ADAMSON
BY
ATTORNEY

OSCILLATORY VALVE FOR SELECTIVELY CONNECTING THREE INLETS TO AN OUTLET

This invention relates to a new and improved oscillatory valve for selectively connecting three inlets to an outlet. More particularly, the invention relates to a valve construction wherein by a small oscillatory movement of the valve body or gate, the operator may connect to an outlet any of three sources.

A particular feature of the invention is the fact that despite the small angular movement of the valve gate, each of the inlets is at all times shielded from communication with the others and also that the outlet cannot communicate with more than one inlet at any time interval.

Still another feature of the invention is the fact that by inserting annular seal rings in the valve body and the cover therefore and correspondingly shaping the peripheral edges of the gate, a very effective seal is provided.

The present invention has particular application in specialized uses where the operator must rapidly and positively connect one of a plurality of inlets to an outlet. Thus one of the inlets may be a source of compressed air, another a source of vacuum and a third a source of a fluid under pressure. In certain medical diagnostic installations, the physician must very rapidly apply either pressure, vacuum or some fluid to the patient. The present invention provides an improved and highly effective valve for such purpose. It will be understood, of course, that the valve has application to a number of other uses besides that set forth.

Other objects of the present invention will become apparent upon reading the following specification and referring to the accompanying drawings in which similar characters of reference represent corresponding parts in each of the several views.

Figure 1:
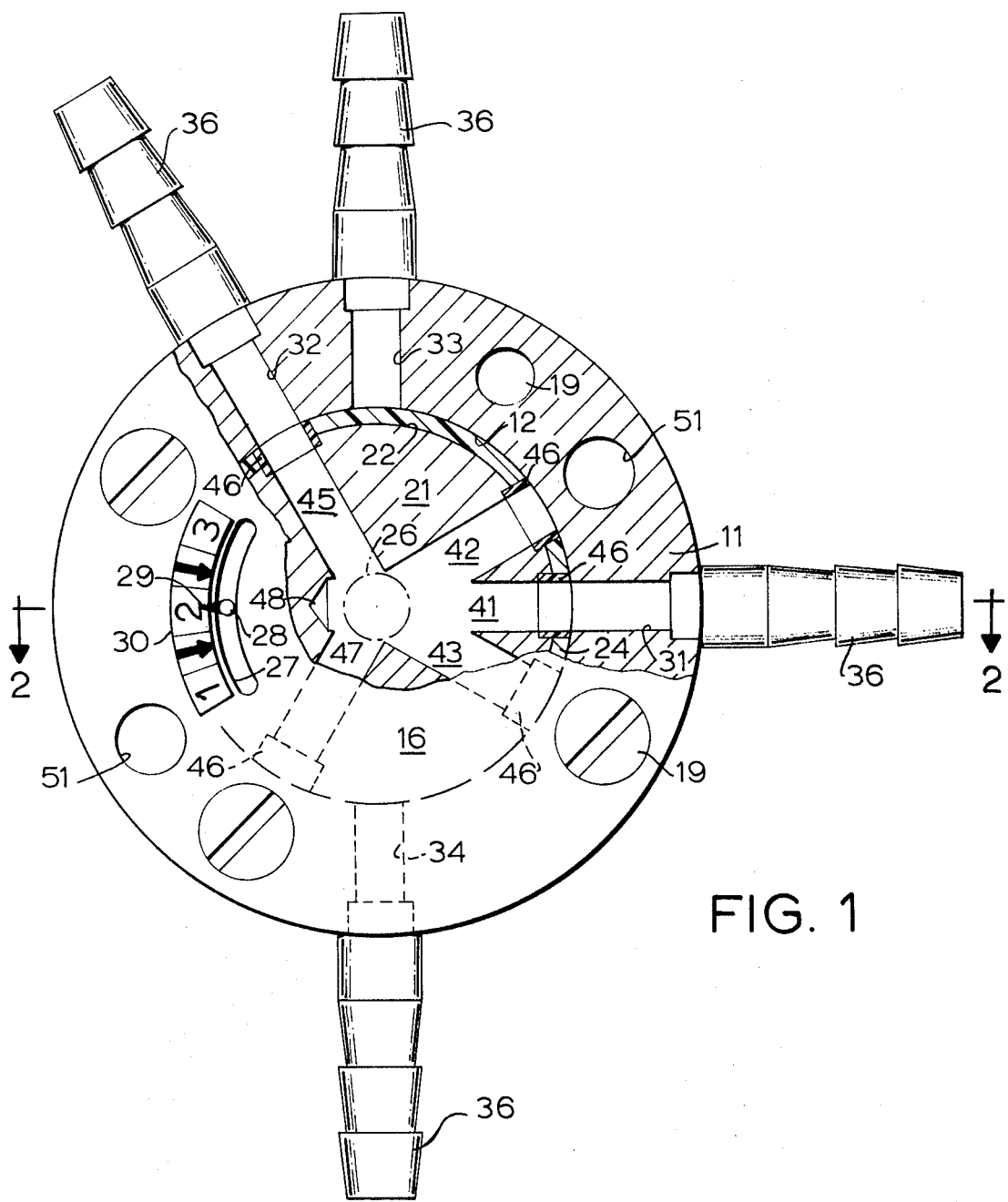
FIG. 1 is a plan view of the valve partly broken away to reveal internal construction.
Figure 2:
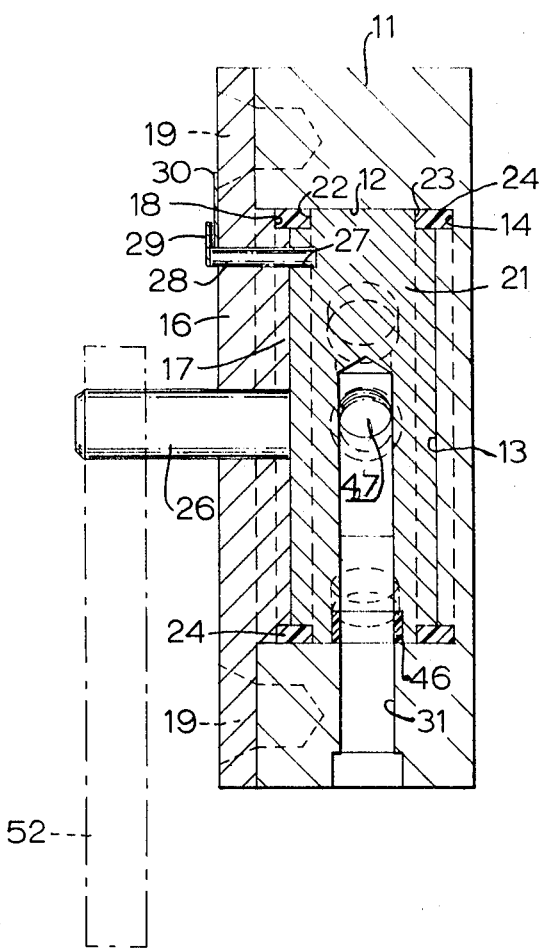
FIG. 2 is a sectional view taken substantially along the line 22 of FIG. 1.

Housing 11 is formed with a circular counterbore 12, leaving a bottom 13 and an open top. An annular groove 14 is recessed into bottom 13, having the same outside diameter as counterbore 12. Cover 16 fits over housing 11 and has a projection 17 having the same outside diameter as the diameter of counterbore 12. A peripheral groove is formed in the projection 17, the inside diameter of said groove being the same as that of groove 14. A pair of annular inert plastic seals 24 is provided, one seal being partially recessed into groove 14 and the other into groove 18. Screws 19 hold cover 16 on body 11. Fitting within counterbore 12 is a circular, disclike valve body 21 having a thickness equal to the distance between the bottom 13 and the inner surface of projection 17. Peripheral grooves 22, 23 are formed in the top and bottom surfaces respectively of body 21, their inside diameters being equal to those of grooves 18 and 14 respectively. Annular seals 24 each fit partially into the grooves 14 and 18 and also into the grooves 22 and 23 forming a tight seal of body 21 relative to housing 11 and cover 16 and also of cover 16 relative to housing 11.

Stem 26 fits in the center of body 21 and extends out through a hole in cover 16. Formed in body 21 is an arcuate groove 27 of a length of 60°. Pin 28 fits into the underside of cover 16 and extends out through groove 27. Accordingly, rotation of stem 26 is limited to a 60° movement. The outer end of pin 28 carries pointer 29 which cooperates with indicator plate 30 on cover 16 to indicate the position of body 21.

Outlet port 31 is formed radially in housing 11. Spaced 120° from port 31 is radial first inlet port 32. Spaced 90° to either side of outlet port 31 in opposite directions are second and third inlet ports 33, 34, respectively. Each of the inlet ports and the outlet ports are provided with fittings 36 so that different inlet sources may be connected to the inlet ports and a conduit may be connected to the outlet port.

It will be understood that various forms of fittings may be used and that those illustrated herein are merely one convenient type of conventional fitting.

Formed in body 21 is a central outlet port 41 which extends radially to and beyond the center of the body. Spaced 30° to either side of port 41 are second and third outlet ports 42, 43 respectively which extend to the center of body 21. Spaced 120° to either side of central outlet 41 are first and second radial inlet ports 46 and 47 respectively. Ports 41, 42, 43, 45 and 47 all converge at a central confluence 48 of the ports. Inserted in a counterbore in the outer end of each of the ports in body 21 is an annular seal 46 which seals against the bottom of its counterbore and against counterbore 12 and thus prevents leakage of one of the sources of inlet fluid to the other.

The valve is mounted by means of mounting holes 51 or other conventional means to a location where the handle 52 on stem 26 may be conveniently gripped by the operator. A conduit is attached to fitting 36 of port 31 and discharges at a desired location such as at a specific location in a patient. A source of some suitable fluid is connected to the fitting 36 of first inlet port 32. Another fluid such as compressed air may be connected to port 33 and vacuum to port 34. It will be understood that these sources of fluid are merely illustrative. With the valve in the position shown in FIG. 1, the source connected to port 32 is connected to the outlet 31. Pin 28 is in the middle of slot 27. By turning stem 26 30° in a clockwise direction, port 41 is closed from contact with port 31 and port 42 is in communication with port 31. Simultaneously, port 45 communicates with port 33. Hence a source of compressed air is delivered to the outlet conduit through ports 33, 45 and 42. If the stem 26 is turned 60° in a counterclockwise direction from the position of adjustment last described (or, in other words, if it is turned 30° from the initial position shown in FIG. 1), then port 34 communicates with port 47 and port 43 communicates with port 31. Thus a source of vacuum is applied to the outlet conduit. It is observed that the maximum angular distance to which the valve body 21 is turned is 60°. Only one inlet is at any time connected to the outlet and the various inlets and outlets are sealed from each other at all times except when communicating through the holes in the gate.

Although the foregoing invention has been described in some detail, by way of illustration and example for purposes of clarity of understanding, it is understood that certain changes and modifications may be practiced within the spirit of the invention and scope of the appended claims.

What I claim is:

1. A valve having a housing formed with a central cavity, a circular body in said cavity, means for oscillating said body in said cavity about its axis between a plurality of positions of adjustment, an outlet port in said housing, a first inlet port in said housing spaced 120° from said outlet port, second and third inlet ports in said housing each spaced 90° to either side of said outlet port, all said ports in said housing extending radially relative to said axis and communicating with said cavity, said body formed with intercommunicating radial first, second and third outlet ports and first and second inlet ports, said second and third outlet ports in said body being spaced 30° to either side of said first outlet port, said first and second inlet ports in said body being spaced 120° to either side of said first outlet port.

2. A valve according to claim 1 in which each said port in said body is formed with a counterbore at its outer end and which further comprises an annular port seal in said counterbore bearing against said cavity.

3. A valve according to claim 1 which further comprises means on said body and said housing restricting oscillatory movement of said disc to 60°.

4. A valve according to claim 1 in which said housing is formed with a counterbore within which said body is received with the bottom of said body resting on the bottom of said counterbore and a cover secured to said housing engaging the top of said body.

5. A valve according to claim 4 in which said cover is formed with a circular projection dimensioned to fit inside said counterbore.

6. A valve according to claim 5 in which a first groove is formed in said counterbore, second and third grooves in the periphery of the top and bottom of said body and a fourth groove in the periphery of said projection and which further comprises a first annular sealing ring in said first and second grooves and a second annular sealing ring in said third and fourth grooves.